Patented July 1, 1947

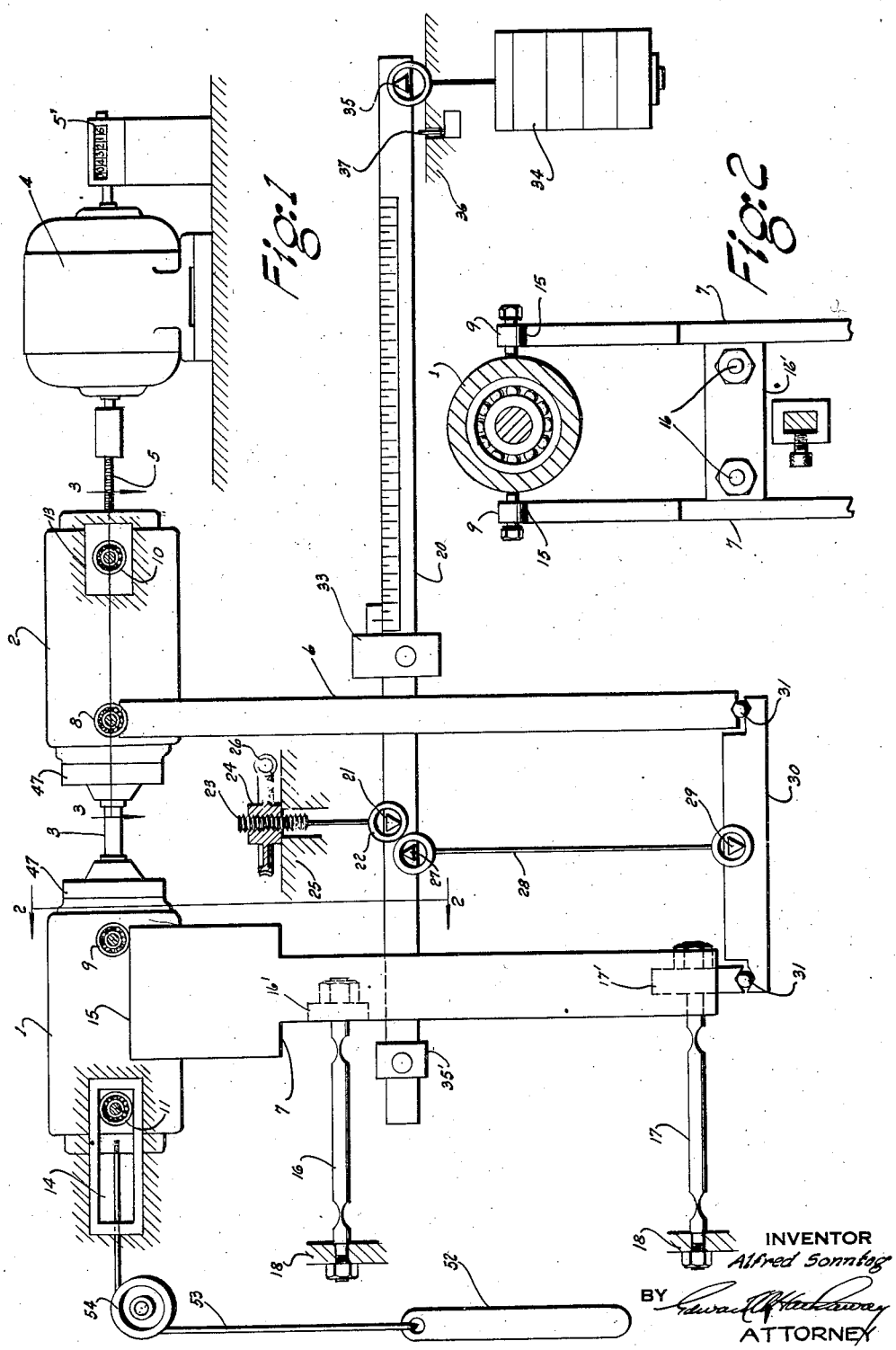

2,423,349

UNITED STATES PATENT OFFICE 2,423,349

ROTATING BEAM FATIGUE TESTING MACHINE

Alfred Sonntag, Greenwich, Conn., assignor, by mesne assignments, to The Baldwin Locomotive Works, a corporation of Pennsylvania Application July 14, 1944, Serial No. 544,858

10 Claims. (Cl. 73—91)

This invention relates generally to materials testing apparatus and more particularly to a rotating beam fatigue testing machine.

Rotating beam fatigue machines have been heretofore deficient in various functional aspects which prevented obtaining the highest possible degree of precision results combined with ruggedness of construction, flexibility of operation and ease of adjustment. Certain objects and advantages of my improved machine may be used for either upward or downward loading of the specimen, although upward loading has some peculiar advantages as disclosed herein.

One object of my invention is to provide improved means whereby variable length specimens may be employed in a relatively simple and expeditious manner.

Another object is to provide an improved loading system whereby large increments of load may be applied to the usual lever weighing system without introducing shock loads on the specimen such as heretofore generally occurred when the weights are carelessly added to the bale rod.

A further object is to provide improved means whereby upon failure of a specimen the adjacent ruptured ends thereof will not be able to produce usual disturbances which arise from the irregularities of the ruptured ends rubbing over each other during their continued rotation.

It is also an object of my invention to provide an improved rotating beam fatigue machine in which the various operating and loading parts are combined in such a manner as to insure accurate zero loading. Heretofore rotating beam machines have been so arranged that some degree of initial loading is placed upon the specimen immediately when all of the parts are in their normal operative testing relation.

A still further object is to provide an improved rotating beam fatigue machine in which all of the foregoing as well as other objects accomplished by a combination of elements which are so functionally and structurally related to each other as to provide a highly cooperative action between each other whereby various structural elements may perform multiple functions certain of which accomplish one object and others of which accomplish another of the objects.

Other objects and advantages will be more apparent to those skilled in the art from the following description of the accompanying drawings in which:

Fig. 1 is a combined mechanical and diagrammatic outline of my improved fatigue machine;

Fig. 2 is a section taken substantially on the line 2—2 of Fig. 1; and

Figure 3:
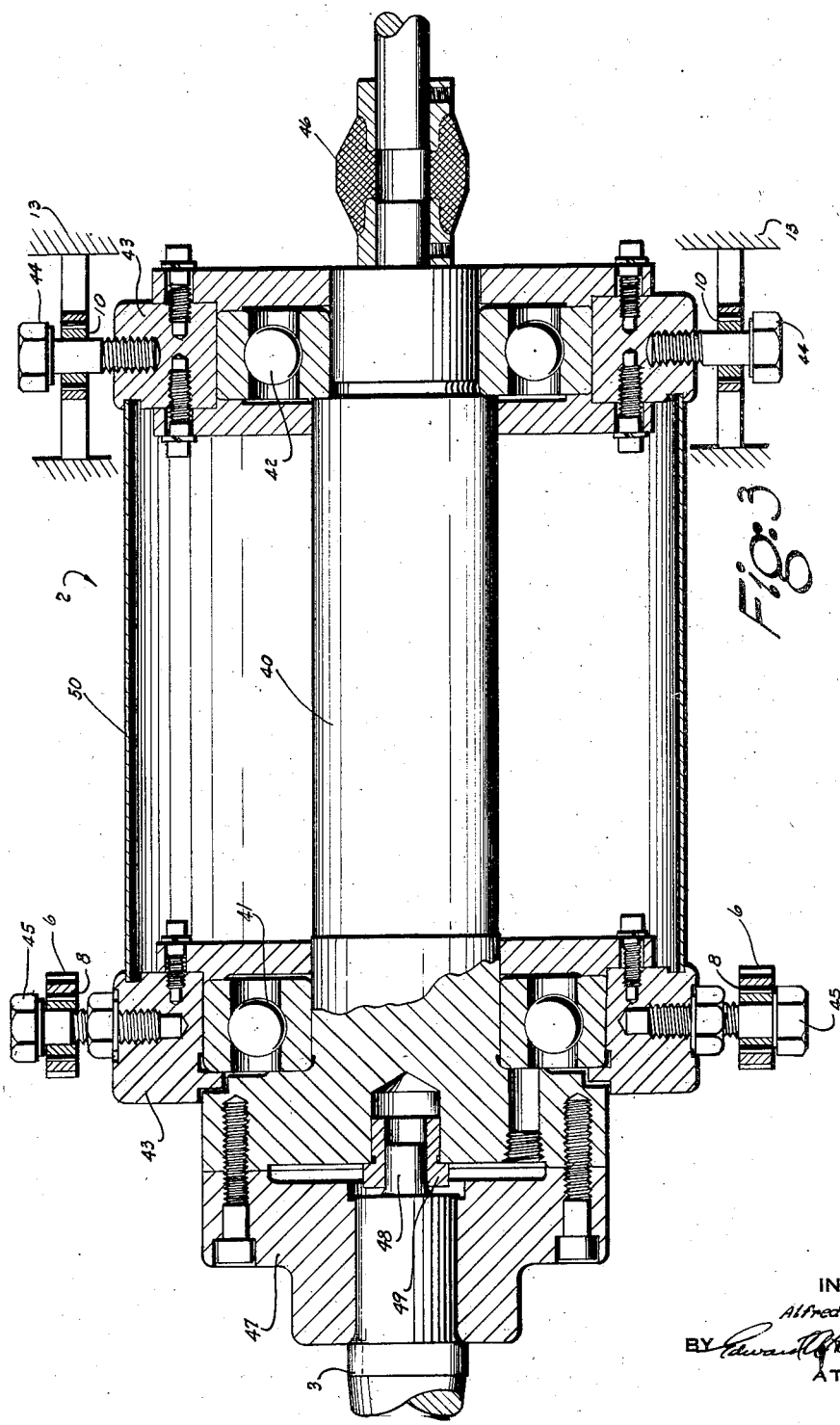
Fig. 3 is an enlarged horizontal section through the right hand bearing taken substantially on the line 3—3 of Fig. 1.

In the particular embodiment of the invention disclosed herein, I have shown a pair of loading heads 1 and 2 to which is connected a specimen 3 while an electric motor 4 is connected by a flexible shaft 5 to the head 2 for rotating the specimen, the number of revolutions being counted by a counter 5'. The specimen loading means produces a zero loading on specimen 3 by imposing an upward loading force on the heads 1 and 2. To do this I employ, among other elements, two sets of compression loading links 6 and 7 each set consisting of two links, one on each side of the loading heads. The upper ends of these links bear against suitable bearings 8 and 9, preferably needle type bearings mounted on studs extending outwardly from the loading heads 1 and 2. The upward force on the heads is taken by suitable bearings 10 and 11 secured to the outer ends of the bearings on opposite sides thereof, the fixed bearings 10 being supported upwardly against any suitable stationary frame portion 13, while the bearings 11 are slidably supported by guiding surfaces of slots 14 formed in a stationary frame. The slots 14 allow longitudinal adjustment of bearing head 1 to any desired axial position to accommodate different lengths of specimens 3. It will be understood that the bearing 10 preferably has only a single fixed position. The upper horizontal surfaces 15 of the set of loading links 7 are the same length as slots 14 thereby permitting bearing rollers 9 on opposite sides of the loading head 1 to always have loading contact with links 7 regardless of the length of specimen 3. As shown in Fig. 2, the present position of bearings 9 is eccentric with respect to the central vertical axis of the links 7 although at other times depending upon the length of the specimen, the bearings may coincide with the vertical axis or may be on the left side thereof. I overcome the eccentric effects by employing two pairs of upper and lower flexure links 16 and 17 whose inner ends are rigidly secured to the pair of links 7 by cross pieces 16' and 17' while the outer ends of the flexure links are secured to a permanent frame portion 18. The flexure links thus resist any eccentric forces or couples in the loading links 7 and at the same time allow complete freedom of vertical movement.

To load the links 6 and 7 a lever 20, provided with knife edges 21 on its opposite sides, is supported in knife edge rings 22 which, in turn, are connected to a screw 23 having a nut 24 suitably centered and supported on a stationary frame part 25. The nut 23 may be manually adjusted or driven by power through a suitable worm end gear 26. The lever 20 has another set of knife edges 27 on its opposite sides connected by rings and a rod 28 to a lower set of knife edges and rings 29 connected to an equalizing crosshead 30. The ends of this crosshead are connected by a pair of bearings 31 or other suitable pivotal means to the lower ends of links 6 and 7. A small counterpoise weight 33 may be manually moved along lever 20 to impose any desired small increment of load on the specimen while large increments of load may be applied by usual slotted weights 34 connected by knife edges and rings 35 to the outer end of lever 20. Any adjustable counterweight 35' on lever 20 insures zero loading of the specimen by reason of being able to balance all of the loading elements about stationary knife edge 21.

Heretofore, in order to avoid imposing a shock load on the specimen 3, it has been necessary to exercise an extraordinary degree of care in applying weights 34. The care with which the weights had to be added was such an exacting condition in most testing laboratories that persons of only the highest degree of training and integrity were allowed to add additional weights. To overcome this difficulty and allow a person of ordinary skill to add additional large weights 34 without danger of imposing a loading shock on the specimen I have provided the above described loading screw and nut 23 and 24 in combination with a stationary frame abutment 36 whereby upon lowering the screw 23 the outer end of lever 20 may be dropped until it engages the portion 36. Thereupon additional weights 34 may be added without transmitting a shock force to the specimen. To stop rotation of the specimen while adding such additional weights 34 a limit switch 37 may be disposed beneath lever 20. The limit switch is connected to motor 4 to shut off its current when lever 20 has fallen to a predetermined point. To reload the specimen it is only necessary to adjust nut 24 until lever 20 is lifted free of stop 36 and switch 37.

Various types of loading heads 1 and 2 and bearing arrangements therein as well as various types of specimen engaging means may be used, but I preferably employ a shaft 40 journalled in bearings 41 and 42 which, in turn, are positioned in bearing supports 43 carrying the loading and supporting studs 44 and 45 for bearings 8 and 10. The shaft 40 may be connected to the motor either through a flexible shaft 5 or a flexible coupling 46 (Fig. 3) while the other end of the shaft is flanged to allow a specimen collar 47 to be bolted or otherwise suitably secured thereto. The specimen 3 preferably has a forced fit with the collar 47 while a small centering pin 48 formed on the specimen is received in a centering bushing 49. It will also be understood that the heads 1 and 2 and their specimen collars 47 are constructed identically to each other and hence the description of one will suffice for both, except of course that motor 4 is connected to shaft 40 in only the right hand head 2 and the heads are placed in right and left hand positions. The advantage of this type of loading head is that bending of the specimen causes shafts 40 to bend in both heads 1 and 2 thereby insuring a uniform bending moment throughout the entire length of specimen 3 inasmuch as the specimen functions as a simple beam loaded at two points and supported by the remotely spaced bearings 10 and 11. This allows a true loading of the specimen. I have provided a light sheet metal cover 50 extending between the two bearing supports of each head, but it will be understood that this sheet metal can easily flex in response to bending of the shafts 40.

Upon failure of a specimen I automatically separate the adjacent irregular ends of the specimen, which normally fractures along a 45 degree angle, thereby avoiding unnecessary disturbance which otherwise arises from the inclined ends hitting each other during rotation. To effect this separation I utilize the specimen length adjusting means 9, 11 and 15 by connecting a yieldable retracting means to head 1 which for purposes of illustration is herein shown as a weight 52 on a rope 53 connected to head 1 and guided over a sheave 54. This relatively simple arrangement in combination with the guide surfaces 14 and 15 allows head 1 to be pulled automatically to the left when the specimen 3 breaks in half. The weight 52 does not impose any appreciable force on specimen 3 during testing thereof and is automatically adaptable to any position in which head 1 may operate depending upon the length of specimen under test. Under such circumstances, the retracting force on the specimen is the same regardless of the length or size of the specimen, and yet such retracting means does not interfere in any way with the adjustment of head 1.

From the foregoing disclosure it is seen that I have provided an improved rotating beam fatigue machine that is relatively simple in construction, operation and maintenance and is very effective in utilizing the various elements in a highly cooperative manner to accomplish the new or improved results outlined herein as well as possible others.

It will of course be understood that various changes in details of construction and arrangement of parts may be made by those skilled in the art without departing from the spirit of the invention as set forth in the appended claims.

I claim:

1. A rotating beam fatigue testing machine comprising, in combination, a pair of pivotally supported heads between which a specimen is mounted for rotation, means for applying a load force to the heads for loading the specimen, means whereby the load applying means is movable in the direction in which the load is applied but is restrained at all times against movement in a direction transverse to said other direction, means including a weighted beam for producing a load on the load applying means, and means for longitudinally shifting one of said heads in said transverse direction relative to the load applying means while the latter remains in its transversely restrained position.

2. A rotating beam fatigue testing machine comprising, in combination, a pair of pivotally supported heads between which a specimen is mounted for rotation, means whereby a load force is adapted to be applied to the heads for loading the specimen, means including a weighted beam for producing a load on said load applying means, and said load applying means having a plurality of horizontal surfaces certain of which pivotally support one of the heads while load is applied through other of the surfaces to said latter head, whereby said surfaces allow said latter head to be longitudinally moved while the load applying means remains in a single operative position throughout all longituidnal movements.

3. A rotating beam fatigue testing machine comprising in combination, a pair of pivotally supported heads between which a specimen is mounted for rotation, means connected to said heads at points between the pivotal supports for the heads for loading the specimen, flexure means for laterally supporting said loading means while allowing the same to have free movement in the direction of loading, and means for producing a load force on said loading means.

4. The combination set forth in claim 3 further characterized by the provision of means whereby said heads may be relatively longitudinally shifted to accommodate specimens of different lengths.

5. A rotating beam fatigue testing machine comprising, in combination, a pair of pivotally supported heads between which a specimen is supported for rotation, means connected to said heads at points between their pivotal supports for applying a load on the specimen in an upward direction thereby allowing a zero load to be obtained, and a weighted beam for producing a load on said load applying means.

6. A rotating beam fatigue testing machine comprising, in combination, a pair of pivotally supported heads between which a specimen is mounted for rotation, means for applying a load to the heads for bending the specimen during its rotation including two sets of substantially parallel links one of which has a fixed point of pivotal connection with one of said heads and the other of which has an elongated horizontal surface provided with a pivotal connection with the other of said heads, said latter head being shiftable longitudinally to any position along said horizontal surface, a weighted lever having a normally fixed fulcrum and a pivotal connection with the lower portion of said lings thereby to produce a loading force on the links, and means for laterally supporting those links which have the elongated horizontal surface upon which one or said heads is longitudinally movable, whereby said lateral supporting means maintains said last mentioned links in their normal load applying position at all times even though the point of pivotal connection with said elongated surface is located eccentrically with respect to the vertical axis of said link during some part of a testing operation.

7. A rotating beam fatigue testing machine comprising, in combination, a pair of pivotally supported heads between which a specimen is mounted for rotation, means for applying a load force to the heads for bending the specimen during rotation thereof, means for producing a load on the load applying means, and means for longitudinally moving said heads away from each other automatically upon failure of a specimen.

8. A rotating beam fatigue testing machine comprising, in combination, a pair of pivotally supported heads between which a specimen is mounted for rotation, means for applying a load force to the heads for bending the specimen during rotation thereof, means including a beam and normally fixed and movable fulcrums operatively connected to said beam whereby weights are adapted to be placed on the beam to produce and transmit a load to the load applying means, and means for relatively shifting said fulcrums whereby said load applying means may be rendered inoperative so that when a weight is placed on said beam shock loads on the specimen are prevented.

9. A rotating beam fatigue testing machine comprising, in combination, a pair of pivotally supported heads between which a specimen is mounted for rotation, means for applying a load force to the heads for loading the specimen, means including a beam and normally fixed and movable fulcrums operatively connected to said beam whereby weights are adapted to be placed on the beam to produce and transmit a load to the load applying means, and means for shifting said normally fixed fulcrum whereby said load applying means may be rendered inoperative so that when a weight is placed on said beam shock loads on the specimen are prevented and thereafter said fulcrum may be progressively shifted back to its normal position to gradually reapply load to the specimen.

10. A rotating beam fatigue testing machine comprising, in combination, a pair of pivotally supported heads between which a specimen is mounted for rotation, means for applying a load force to the heads for loading the specimen, means including a beam adapted to have weights placed thereon for producing a load on the load applying means, means whereby said load applying means may be rendered inoperative so that when a weight is placed on said beam shock loads on the specimen are prevented, and means for discontinuing rotation of the specimen automatically in response to removal of a load from the specimen thereby to allow an additional weight to be placed on the beam without shock loads.

ALFRED SONNTAG.

REFERENCES CITED

The following references are of record in the file of this patent:

UNITED STATES PATENTS

| Number | Name | Date |
|---|---|---|
| 2,154,277 | Moore | Apr. 11, 1939 |
| 1,193,686 | Heisler | Aug. 8, 1916 |
| 1,608,804 | Moore | Nov. 30, 1926 |

FOREIGN PATENTS

| Number | Country | Date |
|---|---|---|
| 488,167 | Germany | Dec. 21, 1929 |